(12) United States Patent
Parulski et al.

(10) Patent No.: US 6,292,218 B1
(45) Date of Patent: *Sep. 18, 2001

(54) ELECTRONIC CAMERA FOR INITIATING CAPTURE OF STILL IMAGES WHILE PREVIEWING MOTION IMAGES

(75) Inventors: Kenneth A. Parulski, Rochester; Timothy J. Tredwell, Fairport, both of NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/895,094

(22) Filed: Jul. 16, 1997

Related U.S. Application Data

(62) Division of application No. 08/367,399, filed on Dec. 30, 1994.

(51) Int. Cl.[7] ........................... H04N 5/225; H04N 5/222
(52) U.S. Cl. ...................................... 348/220; 348/333.11
(58) Field of Search ..................................... 348/220, 221, 348/222, 333, 321, 223, 333.11, 333.12

(56) References Cited

U.S. PATENT DOCUMENTS

| | | | |
|---|---|---|---|
| 4,819,059 | * | 4/1989 | Pape ..................................... 348/220 |
| 4,876,590 | * | 10/1989 | Parulski ............................... 348/220 |
| 5,226,114 | * | 7/1993 | Martinez et al. ..................... 395/128 |
| 5,440,343 | * | 8/1995 | Parulski et al. ...................... 348/316 |
| 5,452,017 | * | 9/1995 | Hickman .............................. 348/646 |
| 5,493,335 | * | 2/1996 | Parulski et al. ...................... 348/233 |
| 5,828,406 | * | 10/1998 | Parulski et al. ...................... 348/220 |
| 5,923,816 | * | 7/1999 | Ueda ................................... 348/220 |

* cited by examiner

Primary Examiner—Wendy R. Garber
Assistant Examiner—Alicia M Harrington
(74) Attorney, Agent, or Firm—Pamela R. Crocker

(57) ABSTRACT

An electronic camera uses a relatively more complex digital image processing technique in a still image mode to produce high quality still images, and a relatively more simple image processing technique in a motion preview mode to produce preview images of acceptable quality prior to initiation of the still image mode. The more complex digital technique is done in software in a general purpose processor section 35, while the more simple digital technique is implemented in a fixed digital circuit in an application specific integrated circuit 27, which also implements timing and control functions. The motion preview mode uses a shorter image readout period than the still mode and further involves mapping image sensor pixels into a fewer number of color display pixels on a color LCD display 10. The mapping further converts color pixel signals from a mosaic array into a different color pattern on the color LCD display 10.

28 Claims, 10 Drawing Sheets

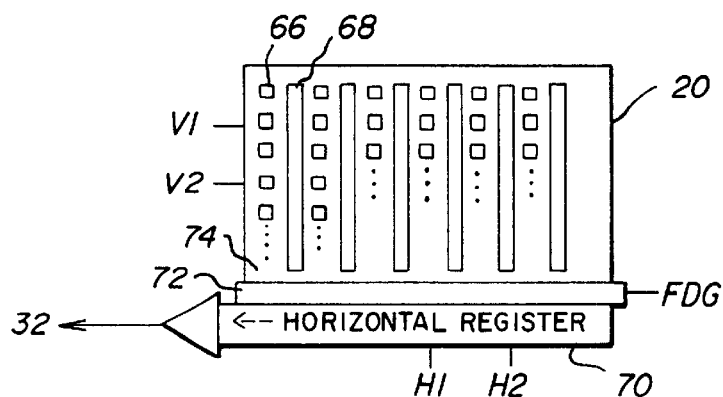
*FIG. 3A*
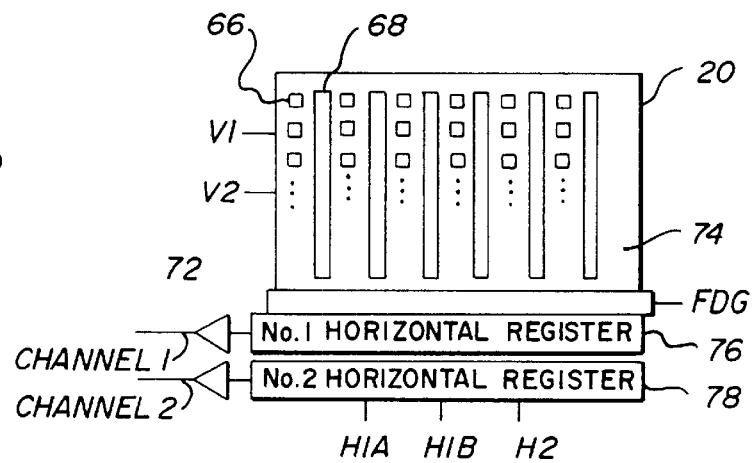
*FIG. 3B*
CCD LINES
| | | | | | | | |
|---|---|---|---|---|---|---|---|
| LINE 1 | G | R | G | R | G | R | G | R |
| LINE 2 | B | G | B | G | B | G | B | G |
| LINE 3 | G | R | G | R | G | R | G | R |
| LINE 4 | B | G | B | G | B | G | B | G |
| LINE 5 | G | R | G | R | G | R | G | R |
| LINE 6 | B | G | B | G | B | G | B | G |
| LINE 7 | G | R | G | R | G | R | G | R |
| LINE 8 | B | G | B | G | B | G | B | G |
*FIG. 4*

CCD LINES

| | | | | | | | | |
|---|---|---|---|---|---|---|---|---|
| LINE 1 | G | R | G | R | G | R | G | R |
| LINE 2 | B | G | B | G | B | G | B | G |
| LINE 3 | | | | | | | | |
| LINE 4 | | | | | | | | |
| LINE 5 | G | R | G | R | G | R | G | R |
| LINE 6 | B | G | B | G | B | G | B | G |
| LINE 7 | | | | | | | | |
| LINE 8 | | | | | | | | |
| LINE 9 | | | | | | | | |
| LINE 10 | | | | | | | | |
| LINE 11 | G | R | G | R | G | R | G | R |
| LINE 12 | B | G | B | G | B | G | B | G |
| LINE 13 | | | | | | | | |
| LINE 14 | | | | | | | | |
| LINE 15 | G | R | G | R | G | R | G | R |
| LINE 16 | B | G | B | G | B | G | B | G |
| LINE 17 | | | | | | | | |
| LINE 18 | | | | | | | | |
| LINE 19 | | | | | | | | |
| LINE 20 | | | | | | | | |

ELIMINATED VIA "FAST DUMP"

FIG. 7

ELECTRONIC CAMERA FOR INITIATING CAPTURE OF STILL IMAGES WHILE PREVIEWING MOTION IMAGES

This application is a division of 08/367,399 filed Dec. 30, 1994.

FIELD OF THE INVENTION

The invention pertains to an electronic still camera for composing and capturing still images, and, more particularly, to an electronic camera having a "motion" mode for previewing a scene and a "still" mode for capturing a particular image in the scene.

BACKGROUND OF THE INVENTION

Consumer camcorders which include the capability of recording analog motion and/or still images on 8mm or VHS videotape have been developed by a number of companies. Motion images are recorded in the same manner as in any standard camcorder. These cameras include a single chip charge coupled device (CCD) sensor having a color filter array that provides a spatially color-sampled image. To record still images, the user pushes a "still capture" button at the desired instant. The image obtained from the CCD sensor is temporarily stored in a digital memory. The image is then read from the memory and recorded onto the videotape. Some camcorders include color liquid crystal displays (LCD), which are also spatially color-sampled devices. Some are relatively large, for example, ranging from approximately 2.5" to 4" in diagonal. Such a display is used, instead of a normal eyepiece viewfinder, to allow the user to properly frame the subject and view the images as they are being recorded. It is also used to view the recorded images as the videotape is played back.

FIG. 1A shows a typical color LCD display, in which the liquid crystal material is trapped between an upper glass plate 1 and a lower glass plate 2. The upper plate 1 has a common transparent electrode 3 and an array 4 of color filters surrounded by a black mask 5. The lower plate 2 includes an array 6 of transparent pixel electrodes juxtaposed underneath the array 4 of color filters. Individual pixel electrodes are activated via thin film transistors (TFT) 7 that are controlled from a video signal on the source lines 8 and a scanning signal on the gate line 9. The LCD display includes the usual polarizer layers (not shown) on the glass plates 1 and 2, such that activation of selected transparent pixel electrodes allows light to pass through the corresponding color filters and reflect to the viewer, thereby creating a color image. A typical LCD display such as the Epson LB 2F-BC00, manufactured by Seiko-Epson Company, Japan, has about 240 lines of pixels and about 300 pixels per line, with an image aspect ratio of 4:3. Such an aspect ratio allows the entire area of the image obtained from the 4:3 aspect ratio NTSC format CCD sensor to be displayed on the LCD screen, so that the LCD screen composition will be the same as the image that is recorded by the camcorder NTSC format recorder, for later display on an NTSC format television display. Note that because the LCD has only 240 lines of pixels, the interlaced NTSC signal is displayed using a "repeat field" technique, where both the odd and even fields from the NTSC format sensor are displayed using the same lines of pixels on the LCD. This LCD, like most commercially available LCDS, has "rectangular" pixels, rather than square pixels, where the distance between pixels in the horizontal direction is for example ⅔ the distance in the vertical direction. The LCD pixels are overlaid with a diagonal RGB stripe pattern as shown in FIG. 1B.

In camcorders, the processing for both the still images and the motion images is identical. Such processing is normally implemented by hardwired analog integrated circuits, although camcorders which use digital image processing integrated circuits have been produced. Such camcorders convert the signal from the CCD sensor into an NTSC composite or component format signal, which is provided to a video recording subsystem or a video output jack. The color LCD display includes circuitry to decode the NTSC composite or component signal back into spatially sub-sampled RGB signals to drive the individual RGB pixels on the LCD sensor.

In a system oriented toward still photography, and in particular a digital still system, it would be desirable to avoid the necessity of generating an NTSC format signal in order to reduce the complexity of the required circuitry. In a totally digital system, that is, both the recording and display channels are digital, it is further desirable to minimize incompatibility between the channels. The problem is to achieve these objective in an architecture that minimizes cost and complexity and maximizes user handling.

SUMMARY OF THE INVENTION

This problem is solved according to the invention by a number of features. In one aspect, the electronic camera is operable in a still image mode according to a relatively more complex digital image processing technique to produce high quality still images, and in a motion preview mode according to a relatively more simple digital image processing technique to produce a preview image of acceptable quality prior to initiation of the still image mode. Such an architecture is particularly adapted to mapping an array of color image pixels from a sensor into an array of color display pixels on an LCD display comprising discrete LCD display pixels fewer in number than image sensor pixels. In that case, a relatively simple digital processing technique combines samecolored image pixel signals into a fewer number of intermediate pixels that correspond to the arrangement of the color display pixels.

The advantage of the invention is that the two modes can be tailored for a relatively low quality "motion" mode and a much higher quality "still" mode. The motion mode images from the CCD sensor are processed by a hardwired digital signal processing circuit that generates low resolution, spatially subsampled digital image data which can directly drive the relatively low resolution LCD display. This reduces the complexity and clock frequency of the required circuitry, compared to generating an NTSC format signal, as is normally done in the prior art. The still mode image from the CCD sensor is processed by a general purpose processor (CPU) which executes an image processing software program in order to produce a high quality digital still image.

BRIEF DESCRIPTION OF THE DRAWINGS

The invention will be described in relation to the drawings, whereon

FIGS. 3A and 3B are diagrams of progressive scan image sensors useful with the camera of FIG. 2;

FIG. 4 is a diagram of the Bayer color filter geometry for the sensor used with the camera of FIG. 1;

FIG. 7 shows the special line skipping pattern used in the preview mode;

DETAILED DESCRIPTION OF THE PREFERRED EMBODIMENT

Figures 1A, 1B:
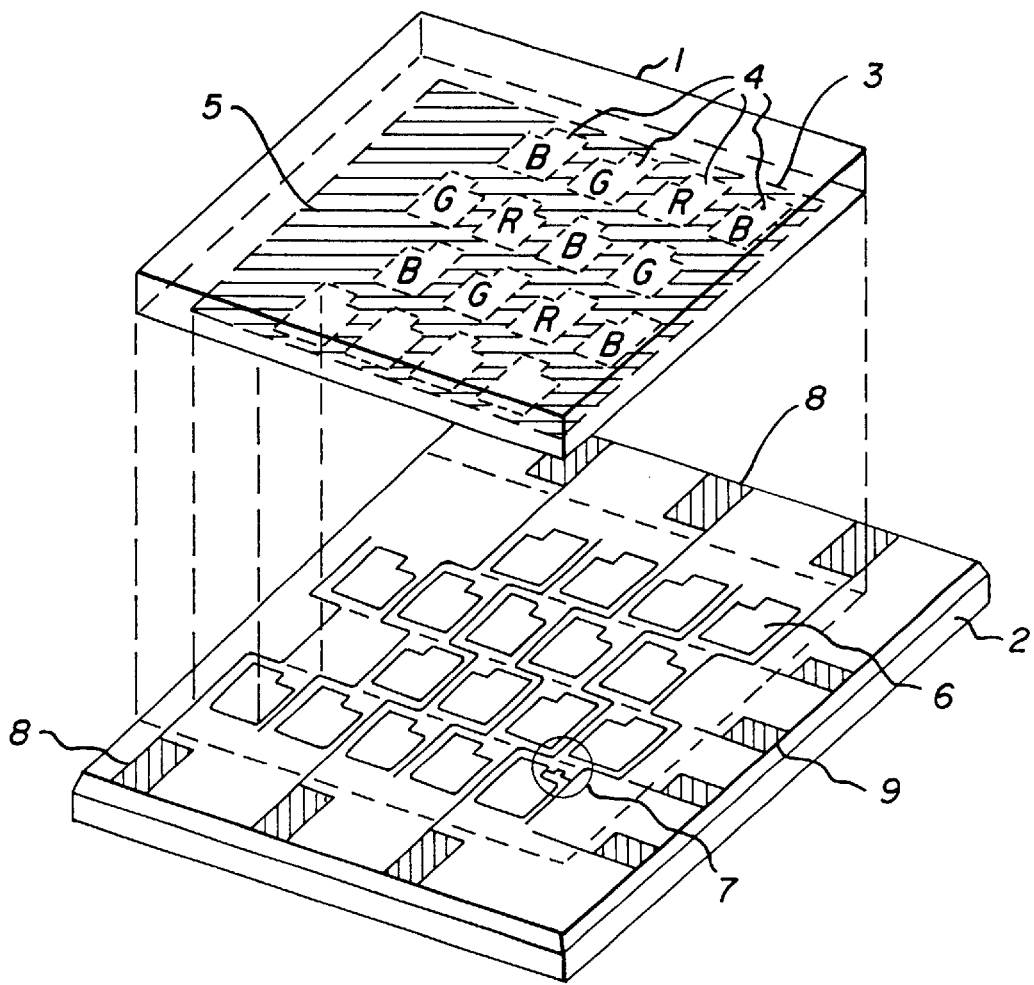
FIGS. 1A and 1B show the structure and color filter pattern of a known color liquid crystal display (LCD)
Figure 2:
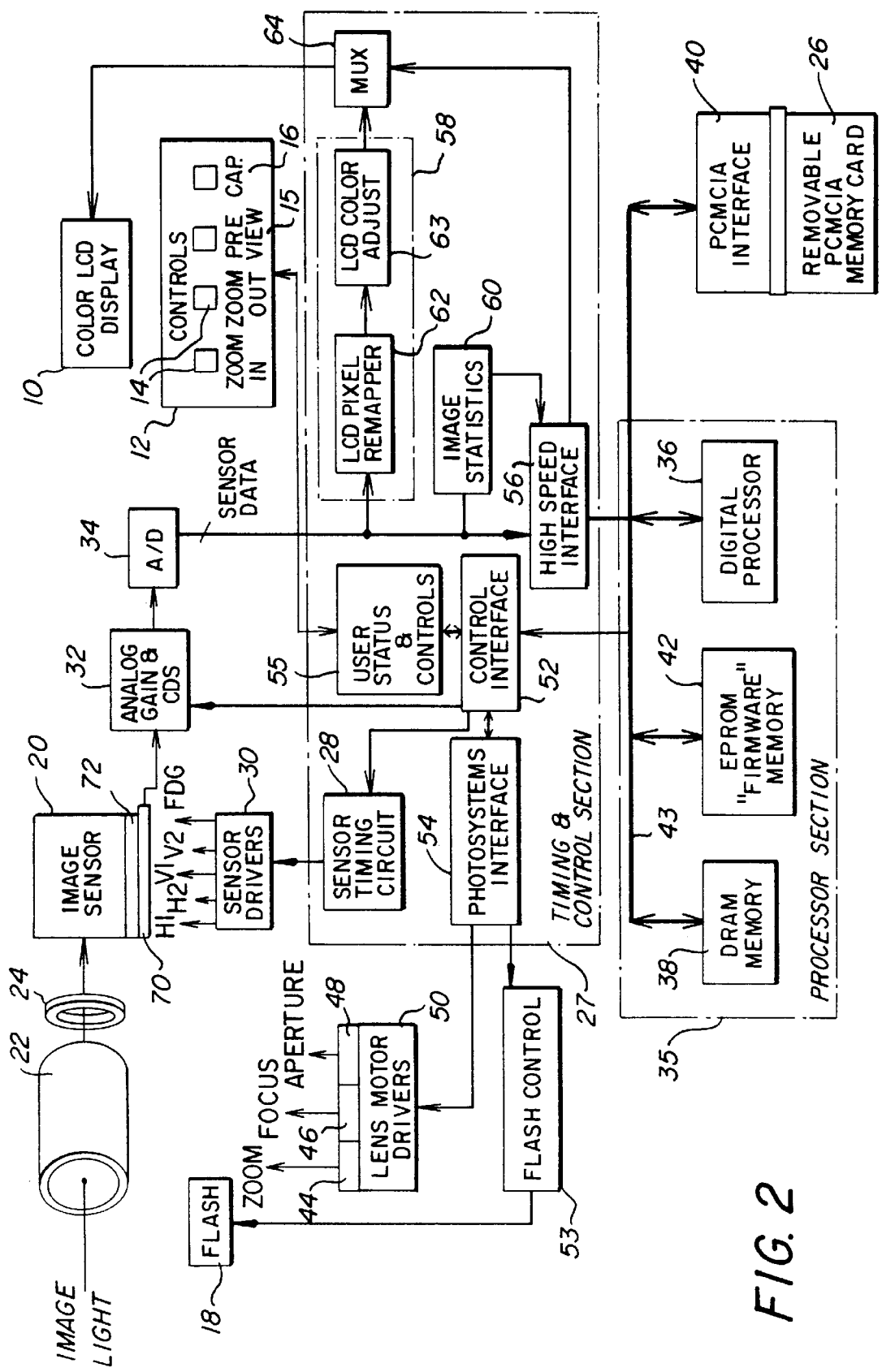
FIG. 2 is a block diagram of an electronic camera incorporating dual modes for composing and capturing a still image according to the invention.

A block diagram of a camera incorporating dual modes of processing according to the invention is shown in FIG. 2. The camera includes an electronic color display, for example, a color liquid crystal (LCD) display 10 of the type shown in FIG. 1A, and a user control section 12 having a number of user control buttons, including zoom buttons 14, a preview button 15 and a capture button 16. To take a still picture, the user turns on the camera (using a power switch not shown), which may be automatically enabled when the user depresses the zoom buttons 14 or the preview button 15, or partially depresses the capture button 16). The user composes the picture by depressing the "zoom in" or "zoom out" buttons 14, and by adjusting the position of the camera, while observing the display image. When the user is satisfied with the composition on the color LCD display 10, the user depresses the capture button 16. The camera then captures a single still image, firing a flash 18 if necessary when the ambient illumination level is low. The still image is focused upon an image sensor 20 by a motor driven zoom lens 22. The intensity of the image light upon the sensor 20 is regulated by a motor-driven, variable, mechanical aperture 24, while exposure time is regulated electronically by appropriate clocking of the sensor 20. The still image from the image sensor 20 is processed and digitally stored on a removable memory card 26.

Control of the sensor is provided by a timing and control section 27, which is an application specific integrated circuit (ASIC) with processing and timing functions, for both capture and preview operating modes. For instance, the timing and control section 27 includes a sensor timing circuit 28 for controlling the image sensor functions. The sensor timing circuit 28 provides the signals to enable sensor drivers 30, which provide horizontal clocks (H1, H2), vertical clocks (V1, V2), as well as a signal FDG for activating a drain structure on the sensor 20. The output of the image sensor 20 is amplified and processed in an analog gain and sampling (correlated double sampling (CDS)) circuit 32, and converted to digital form in A/D converter stage 34. The A/D output signal is provided to a processor section 35, which includes a digital processor 36 for temporarily storing the still images in a DRAM memory 38. The digital processor 36 then performs image processing on the still images, and finally stores the processed images on the removable memory card 26 via a memory card interface circuit 40, which may use the PCMCIA 2.0 standard interface. An EPROM memory 42 is used to store the firmware which operates the processor 36. The components of the processor 35 are interconnected through a data bus 43, which also connects to the timing and control section 27 and to the card interface 40.

The motor-driven zoom lens 22 includes a zoom motor 44, a focus motor 46, and an aperture motor 48 (all controlled by lens motor drivers 50). The timing and control section 27 further includes a control interface 52 connected to the lens motor drivers 50 and to a flash control circuit 53 via a photosystem interface block 54, which controls the operation of the zoom lens 22 and the flash 18. The lens zoom position is controlled by the photosystem interface block 54 based on position input from the zoom control buttons 14 through a user status and control section 55. The focusing, exposure control, and white balance is done automatically, as is typically the case in consumer camcorders. This is done by computing "image statistics" in an image statistics processor 60 in the real-time ASIC (timing and control section 27) as preview images are continuously read out of the image sensor 20. The computed values are then used by a program implemented in the digital processor 36, which decides how to adjust the focus motor, aperture, analog gain control, and analog white balance controls via the control interface 52 and the photosystems interface 54 on the ASIC timing and control section 27. Although the digital processor 36 and the control interface 52 are shown as being within two separate sections, in some implementations the same component could be used to perform both of these functions (as well as other of the recited functions). Sensor image data is passed to the processor section 35 through a high speed interface 56 in the timing and control section 27. The sensor image data is also directed to the color LCD display 10 through a preview mode processing circuit 58.

The timing and control section (ASIC) 27 is operable in two modes, a relatively low quality "motion" mode and a much higher quality "still" mode. In the motion mode, images from the sensor 20 are processed by the preview mode processing circuit 58; in the still mode, images from the sensor 20 are processed in the processor 35. The processor 35 is a software driven digital processing system that is slower than the ASIC 27. The preview mode processing circuit 58 is a hardwired digital signal processing circuit (part of the ASIC 27) that generates low resolution, spatially subsampled digital image data which can directly drive the relatively low resolution color LCD display 10. This reduces the complexity and clock frequency of the required circuitry, compared to generating an NTSC format signal, as is normally done in the prior art. The preview mode processing circuit includes a pixel remapper 62 for mapping the greater number of image pixels from the sensor 20 into the lesser number of display pixels (i.e., corresponding to the array 6 of transparent pixel electrodes in FIG. 1) in the color LCD display 10. The color saturation of the remapped pixels is then adjusted in a color adjustment circuit 63 and its output is applied to a multiplexer 64. The multiplexer 64 selects image data either from the preview mode processing circuit 58, producing a preview image, or from the high speed interface 56, which allows for suitably preprocessed viewing of stored images.

In this camera, the image processing used to create the preview mode is done in the timing and control ASIC 27, since the processing must be done rapidly. About 60 images per second are processed in preview mode. However, since the image quality of the displayed image is limited by the resolution and color gamut of the LCD screen of the LCD color display 10, there is no need for elaborate image processing. Therefore, simple "preview mode" image processing is performed in a fixed digital circuit embedded in the preview mode processing circuit 58 (which is part of the ASIC). The quality requirements for the still mode are much greater, since these images will be downloaded to a computer, and may be displayed on a high resolution CRT display, or printed on a high quality thermal printer. Therefore, the digital image processing must be more elaborate. By using the digital processor 36 to implement software procedures stored in the firmware memory 42, complex procedures can be implemented. These procedures can take several seconds to complete, since real-time operation is not required. Use of firmware-stored software allows the still mode image processing to be upgraded without requiring a new ASIC design. In effect, what happens is that a relatively less complex digital image processing technique is used in the motion preview mode, but at a higher data rate, and a relatively more complex digital image processing technique is used in the still mode, but at a slower data rate.

Figure 12:
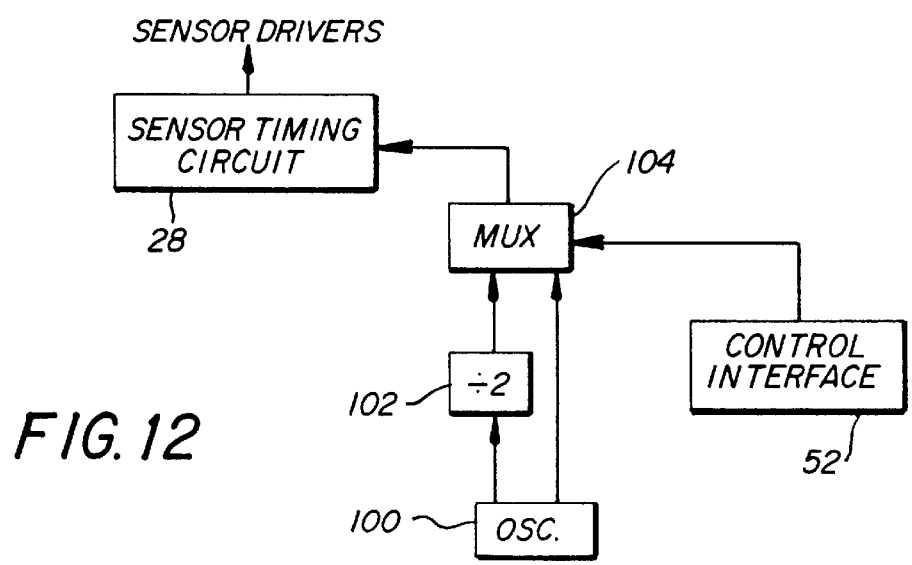
FIG. 12 shows an enhancement to the block diagram of FIG. 2 in which a different sensor clock frequency is used in each of the dual modes.

Since the update rate, that is, the number of images that need to be supplied per unit time, is different for the still mode than for the motion mode, it is beneficial to use different clock frequencies for the different modes of operation. For example, as shown in FIG. 12, a system oscillator 100 produces a 12 mHz clock frequency for use in the motion mode to obtain more updates/second (e.g., 60 images per second), while a divider 102 divides by two to provide a 6 mHz clock frequency for the still mode. The lower frequency allows more time to accurately position the clamp and sample pulses so as to avoid CCD output signal transitions. This increases noise immunity in the still mode. A multiplexer 104 is enabled by the control interface 52 to determine which clock frequency is applied to the sensor timing circuit 28. Though not specifically shown, the changed timing is also communicated to the A/D stage 34 and other timing and control circuits.

The sensor 20 is a progressive scan interline image sensor having a noninterlaced architecture, as shown in more detail in FIG. 3A. The sensor comprises a two-dimensional array of photosites 66, e.g. photodiodes, arranged in rows and columns of image pixels, a plurality of vertical registers 68 adjacent photosite columns for transferring rows of image pixel charge from the photosites 66 to a horizontal register 70 for readout responsive to clock signals from the sensor drivers 30, and a charge drain (specifically, a fast dump structure 72) interposed between the output of the vertical registers 68 and the horizontal register 70 for eliminating complete rows of image pixels at a time from the image sensor 20. A preferred image sensor is the Kodak model CCD KAI-0400CM image sensor, which has approximately 512 active lines with approximately 768 active pixels per line and an image aspect ratio of 3:2. This sensor is described in a Performance Specification document available from Eastman Kodak Company, Rochester, N.Y. Each pixel is 9 microns "square", since both the vertical and horizontal distances between the centers of adjacent pixels are 9 microns. The 3:2 image aspect ratio of the CCD sensor, although wider than the 4:3 aspect ratio of the display, is considered to be a preferred aspect ratio for still photography, in that the standard 35 mm film format, and standard 4R (4"×6") prints also have a 3:2 image aspect ratio. The sensor uses a color filter array pattern known as the "Bayer checkerboard" pattern, described in U.S. Pat. No. 3,971,065, which is shown in FIG. 4. Such a color filter array is characterized by a mosaic pattern in which the filter colors alternate in both line and column directions. In the normal operating mode, all of the image pixels on the sensor are transferred as color image pixels to the horizontal register 70, which delivers a stream of color pixel signals to the analog gain and CDS circuit 32 (see FIG. 2). The color pixel signals are subsequently converted to digital pixel signals in the A/D converter 34.

The sensor 20 uses a progressive scan readout method, which allows the entire image to be read out in a single scan. The accumulated or integrated charge for the photodiodes comprising the pixels 66 is transported from the photosites to light protected vertical (parallel) registers 68 by applying a large positive voltage to the phase-one vertical clock (V1). This reads out every row, or line, into the vertical registers 68. The image pixel charge is then transported from the vertical registers 68 to the horizontal register 70 by two-phase clocking of the vertical clocks (V1, V2). Between the vertical and horizontal registers is the fast dump structure 72, which is further described in the Performance Specification document for the KAI-0400CM sensor. By setting a suitable positive potential on a fast dump gate line FDG, charge from the row of pixel values currently adjacent to the fast dump structure 72 is transferred from the CCD directly into the sensor substrate 74 rather than to the horizontal register 70. This dump, or line clear, is accomplished during the vertical-to-horizontal transfer time. When properly controlled by the sensor timing circuit 28, the fast dump structure 72 allows lines of charge to be eliminated.

The timing and control section 27 operates the electronic camera shown in FIG. 2 in the two aforementioned modes, including a first "still" mode wherein all rows of image pixel charge corresponding to each line are progressively read out through the horizontal register 70 during a single scan, and a second "motion" mode wherein some of the rows of image pixel charge corresponding to some lines are eliminated through the fast dump structure 72 prior to readout. As applied to the embodiment of FIG. 2, the first mode corresponds to a high quality still imaging mode while the second mode corresponds to a special "line skipping" mode for driving the color LCD display 10. In the second mode, the timing and control section 27 controls the fast dump structure 72 to eliminate two or more consecutive lines of image charge from the image sensor 20 for every one or more lines of image charge that are transferred to the horizontal register 70 for readout, thereby generating a pattern of lines (shown in FIG. 7) suitable for driving the LCD display in a "repeat field" mode. An appropriate video signal which displays the entire 3:2 aspect ratio sensor image on the 4:3 aspect ratio LCD, without introducing geometric distortion, is generated by alternately eliminating two or four consecutive lines of image charge for every pair of lines of image charge that are transferred to the horizontal register 70.

Figure 5:
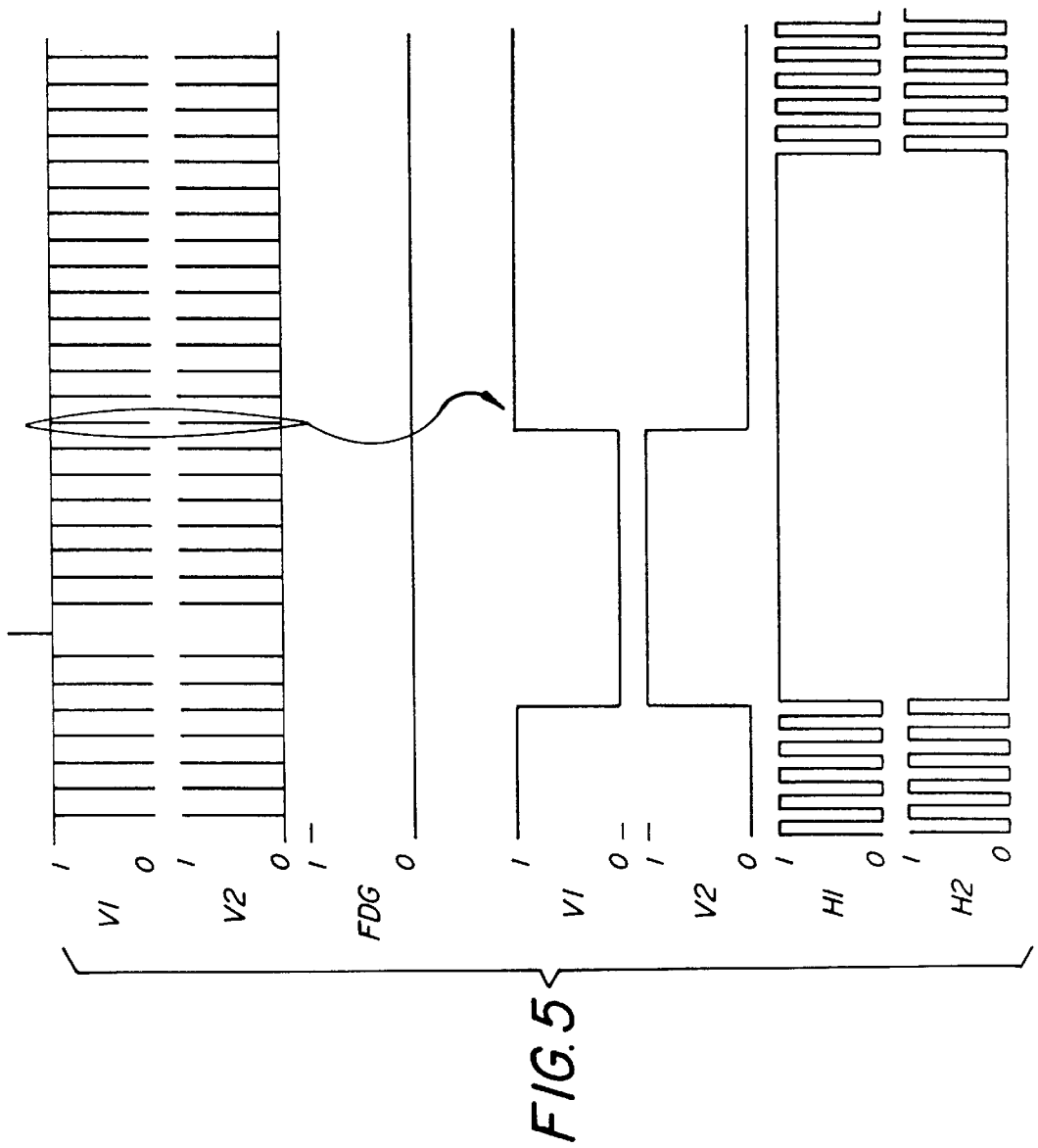
FIG. 5 shows the line timing for the still mode of operation.
Figure 6A:
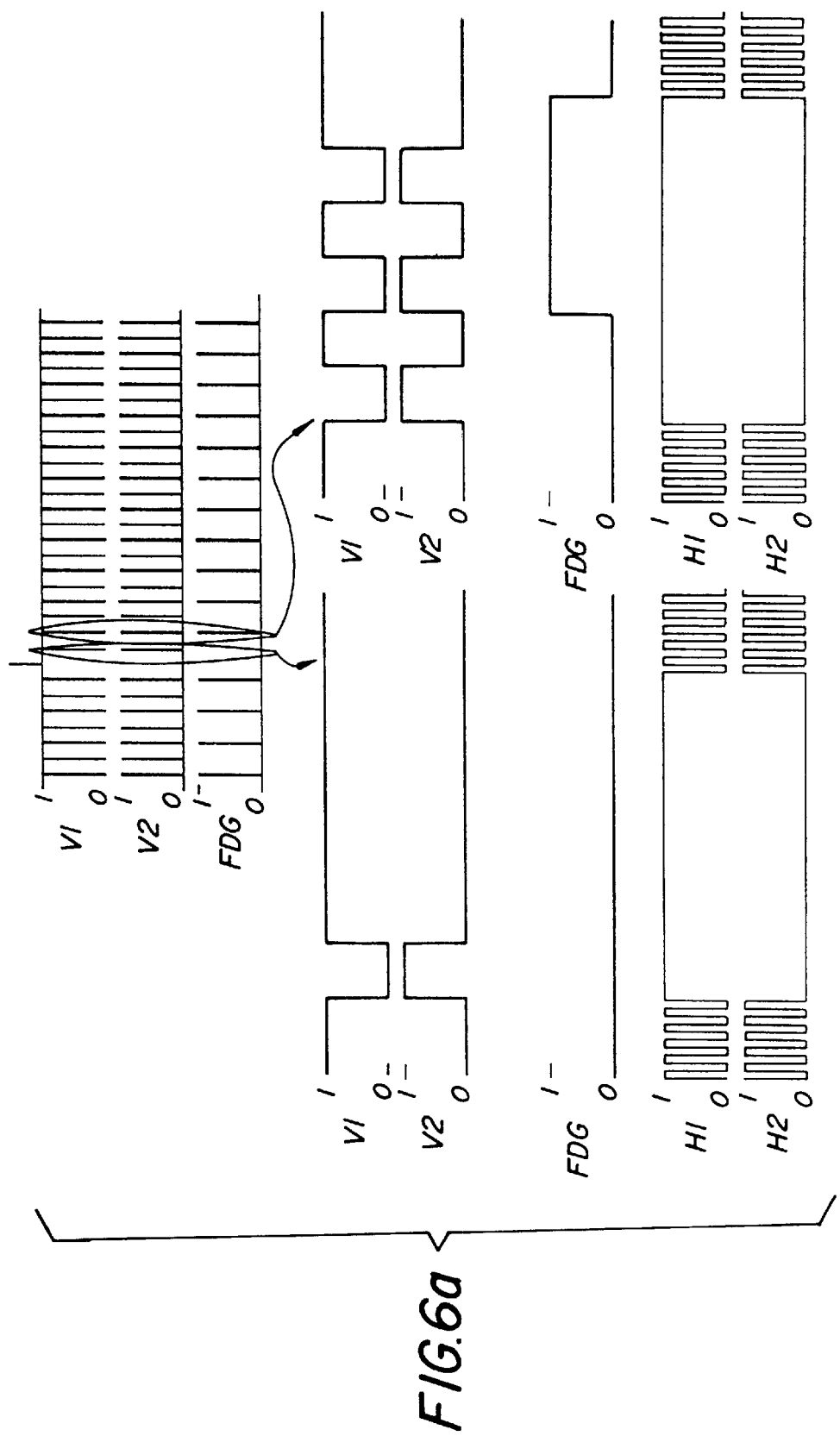
FIGS. 6A and 6B show the line timing for the preview mode of operation.
Figure 6B:
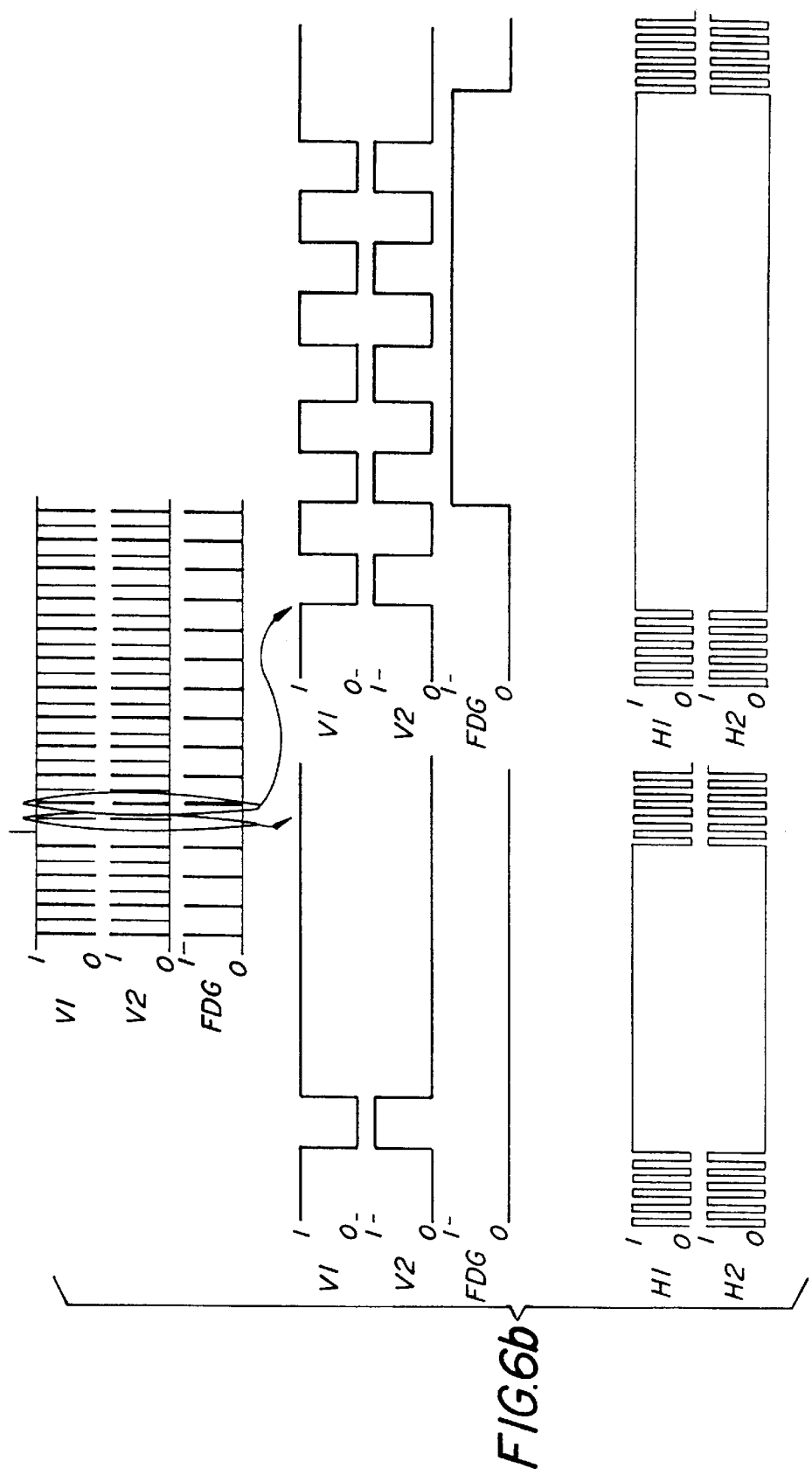

The sensor timing circuit 28 is controlled by the control interface 52 to provide the clock signals V1, V2, H1, H2, and the gate signal FDG according to the two modes of operation. The timing signals for the first mode are shown in FIG. 5; those for the second mode are shown in FIGS. 6a and 6b. The two-phase cycling of signals V1 and V2 control the transfer of lines of image pixel charge from the vertical registers 68 to the horizontal register 70. The two-phase cycling of signals H1 and H2 control the transfer of a stream of color pixel signals from the horizontal register 70 to subsequent circuits in the camera. The level of the signal FDG determines whether the image charge is dumped to the substrate 74 or transferred to the horizontal register 70. When the sensor 20 is clocked using the first timing mode shown in FIG. 5 for all lines of the sensor, all lines of the sensor are clocked out, one after the other, through the horizontal register 70, processed in subsequent camera circuitry, and stored in the removable memory 26. This timing mode provides a high quality progressive scan still image, but may take 1/30 second or longer to read out the still image. Such timing, however, is acceptable for still mode usage, and, as mentioned before, does not require unusually high speed components and, indeed, may benefit from a lower speed lock.

To provide an image to the color LCD display 10, a lower resolution image is suitable, but the update rate must be sufficient to provide good motion rendition and eliminate display flicker. Moreover, the sensor 20 includes the aforementioned array of color filters arranged in a particular mosaic color pattern (e.g., the checkerboard Bayer pattern of FIG. 3), and the lines of image charge that are transferred to the horizontal register 70 should preserve that particular color pattern in the pattern of lines that are generated for the line-skipping readout. To provide this kind of image, the sensor is read out in the second mode as shown in FIG. 7, using the timing shown in FIGS. 6A and 6B. As shown in FIG. 6A, the first two lines (1 and 2) are read out as in the normal mode. These provide a green-red and a blue-green line. The next two lines (3 and 4) are eliminated by turning on the fast dump structure 72 during the time that these lines are transferred past the fast dump structure 72. Next, as shown in FIG. 6B, lines 5 and 6 are read out normally, and then lines 7, 8, 9, and 10 are eliminated. Next, the FIG. 6A timing is used to read out lines 11 and 12, while eliminating lines 13 and 14, and then the FIG. 6B timing is used to read out lines 15 and 16, while eliminating lines 17–20. This process proceeds for the entire image readout period, during which 102 pairs of lines are read out, and 154 pairs of lines are eliminated.

This special "line skipping" readout mode, as shown in FIG. 7, allows the sensor 3:2 aspect ratio image to be fully displayed on a 4:3 aspect ratio LCD without "geometric distortion", that is, without stretching the image vertically, and without cropping off the horizontal edges of the image from the image sensor. This allows the LCD to properly show the entire 3:2 aspect ratio image captured by the sensor, so that an image can be properly composed.

Figure 11:
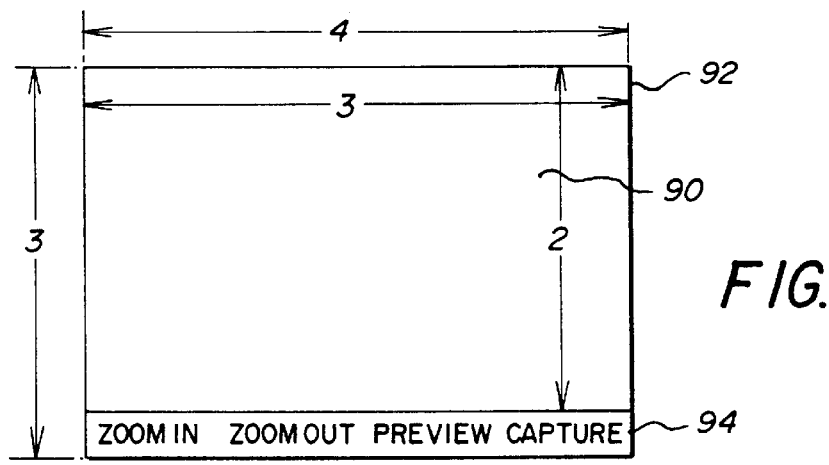
FIG. 11 shows the effect of pixel mapping from a sensor to an LCD display, each having different aspect ratios.

As the 512 lines of the CCD imager are read out using the special "line skipping" mode, they are displayed using only 204 out of the approximately 240 LCD lines of pixels. The remaining approximately 36 lines can either be masked behind a bezel, so that they are not visible, or preferably may be used to display status information, such as the time-of-day, image number, or a "push-button menu" for the user buttons. FIG. 11 shows a useful application of such conversions. A sensor having a 3:2 aspect ratio is shown mapped into an image area 90 of an LCD display screen 92 having a 4:3 aspect ratio. A proportional remapping leaves a status area 94 available for other purposes, specifically to show text indicating the function of a set of reconfigurable control buttons 96 in the control section 12. The function of the buttons is specified by the user status and control section 55 (FIG. 2). This status information graphics data can be supplied by the digital processor to the LCD 10 via high speed interface 56, when the MUX 64 is controlled so as to use the digital data from interface 56, rather than from circuit 58, for supplying data to the final approximately 32 lines of the display 10.

The "line skipping" readout causes some minor vertical sampling artifacts, but these are not noticeable in the small LCD displays. The pixels output for the sensor 20 in line skipping mode continue to have the Bayer-type color filter repeating pattern, so that they can be processed using processing techniques designed for the Bayer pattern.

The processing complexity of the camera of FIG. 2 is considerably simplified by directly mapping the RGB sensor pixels 66 to the RGB pixels of the display 10. The easiest way to do this for the image sensor 20 (512 lines×768 pixels and 3:2 aspect ratio) is to have an LCD display with 512×768 pixels and the same aspect ratio and color filter pattern. However, this would be a custom, costly LCD. Instead, LCDs have fewer display pixels than image pixels on the image sensor, normally have a 4:3 image aspect ratio, and use the diagonally striped RGB pattern shown in FIG. 1B. In this discussion, an LCD pixel array of about 240 lines×312 pixels per line is assumed.

Figure 8:
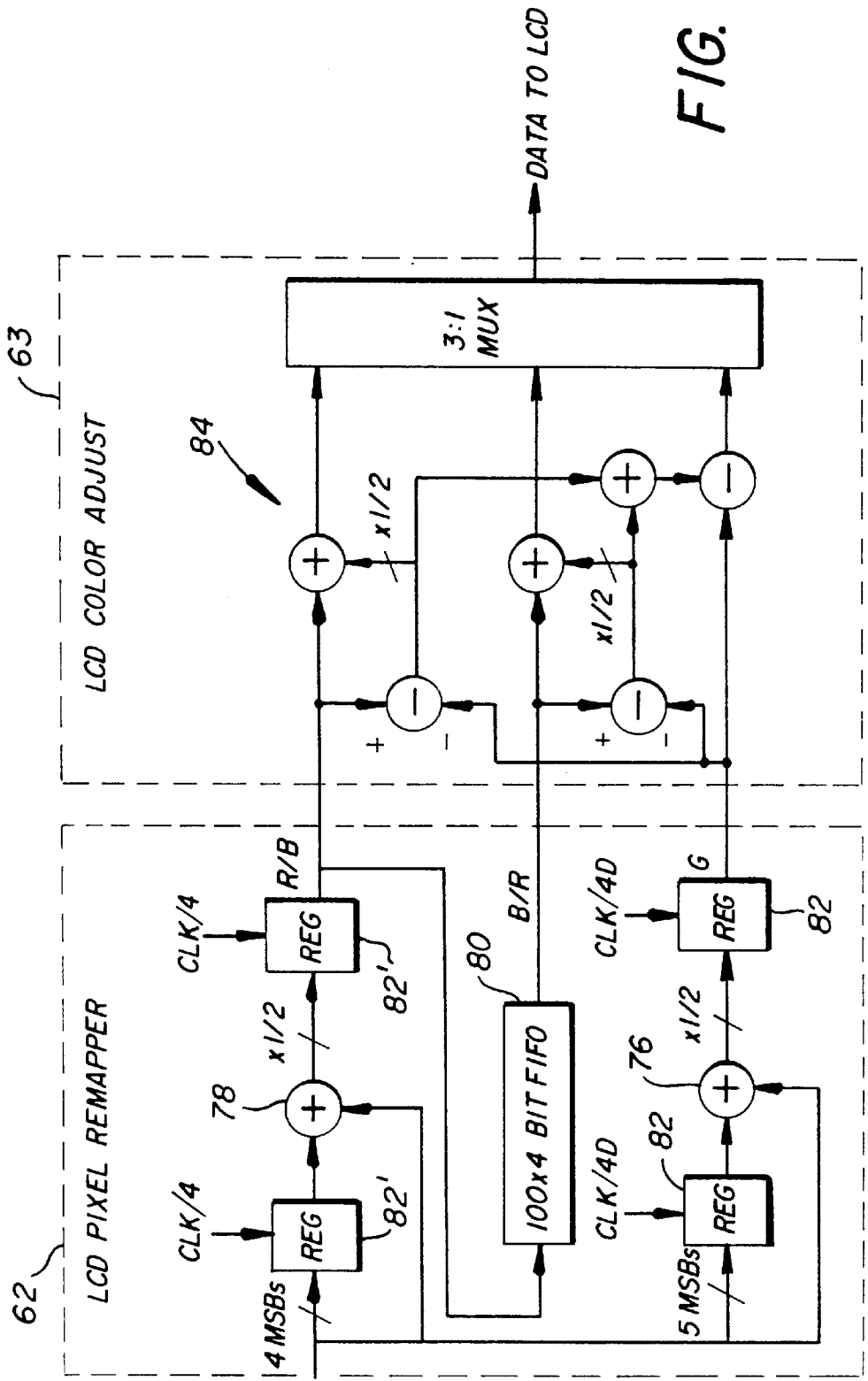
FIG. 8 shows further detail of the preview mode processing circuit shown in FIG. 2.

Therefore, the sensor pixels are processed in a "pixel mapping circuit", such as the LCD pixel remapper 62. A block diagram of this circuit is shown in FIG. 8. Note that there are 768/2=384 green or red/blue pixels per line on the sensor (see FIG. 4). There are about 300/3=100 green, red, or blue pixels per line on the LCD (see FIG. 1B). Thus, there are approximately ¼ as many LCD pixels per line (per color) as there are sensor pixels per line. Therefore, the basic plan is to combine same-colored image pixels into a fewer number of intermediate, combination pixel signals that are then mapped into the color display pixels. For instance, a simple "pixel mapping" circuit maps four green sensor pixel signals into one green LCD pixel for one line by summing two green sensor values, spaced apart by 4 CCD pixel positions, in the green pixel summer 76 and dividing by two via bit-shift wiring. The necessary delay is provided by the registers 82 clocked at one fourth the pixel rate, further delayed by one pixel clock. It also maps four red sensor pixels into one LCD pixel in the same manner (using the red/blue summer 78), and also stores this value in a 100 pixel FIFO 80. The FIFO 80 compensates for the fact that the sensor has line sequential red and blue pixels, by supplying blue pixels on the red sensor lines, and red pixels on the blue sensor lines. Four pixel delays are provided by the registers 82' clocked at one fourth pixel rate (CLK/4). The mapping process is basically, therefore, a process which, in its simplest form, involves averaging of signals to produce a smaller number of output color pixels than input color pixels. (The CFA interpolation algorithm discussed in reference to FIG. 10, on the other hand, produces a larger number of "output" color pixels than input color pixels.) Alternate groups of 2 or 4 lines of sensor values are discarded during preview mode by using the fast dump gate shown in FIG. 3A, as described in connection with the "line skipping" mode. This allows the sensor readout time to be decreased by more than ½ during the preview mode.

Another feature of the design is that by removing the NTSC rate driving circuitry from the color LCD display 10, the active matrix LCD can be updated at a slower frequency than is normally used. This reduces the cost and power consumption of the LCD driver circuits (not shown). For example, the LCD can be updated at 30 Hz (provided the LCD active matrix display is designed so as not to exhibit noticeable flicker at this update rate), instead of 60 Hz.

Once the LCD pixel values are calculated, the LCD color adjust circuit 63 increases the color saturation of the image by forming R-G and B-G color difference signals, and adding or subtracting a fraction of these signals in an array 84 of adders and subtractors from the original RGB signals in order to increase the color saturation of the displayed image. This circuit performs a similar function as a 3×3 color matrix, but uses less hardware and provides less color accuracy. The color accuracy is not critical for the LCD display, however, due to the limited color reproduction quality of such displays. The color reproduction of the still image is much more important, and is done with a more complicated and precise color correction method with the stored firmware in EPROM 42.

Figure 9A:
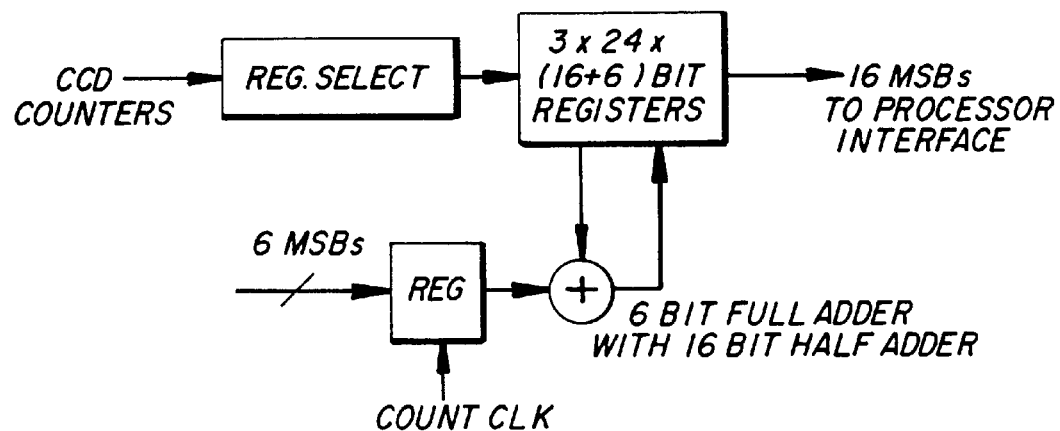
FIGS. 9A and 9B show further detail of the image statistics processor shown in FIG. 2.
Figure 9B:
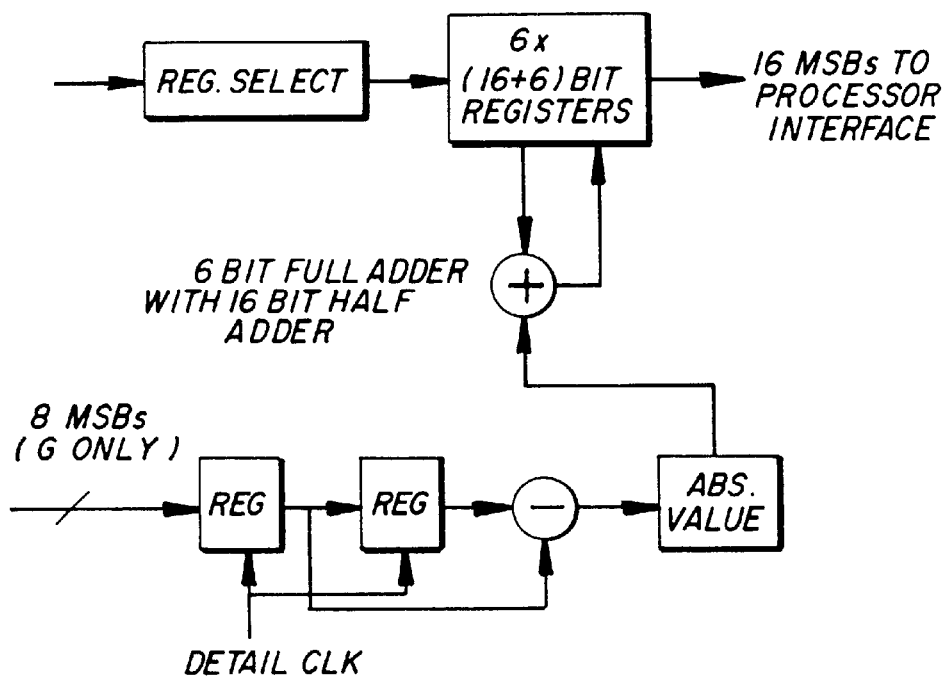

FIGS. 9A and 9B show the processing in the image statistics processor 60, which computes real-time values for both still and motion image capture, all during the preview mode. These values include 24 R, G, and B averages used to set white balance and exposure, and 6 average high frequency "detail" values used to set focus. The 24 RGB averages for white balance are calculated for a group of 4×6 rectangular image regions, for each of R, G, and B; a block diagram of the calculation in one color is shown in FIG. 9A. The 6 average "detail" values for focusing are calculated for green pixels only by accumulating the absolute value of the differences between nearby green values; a block diagram of this calculation is shown in FIG. 9B. These values are computed for each preview image and downloaded to the processor 36. The processor 36 implements a firmware stored procedure which determines the optimum exposure parameters (exposure time, f/stop, and analog gain), white balance settings, and lens focus setting. For the still mode, the processor 36 also decides, based on the last preview images, whether to fire the flash, and determines the optimum exposure parameters, white balance settings, and lens focus setting for the still mode.

Figure 10:
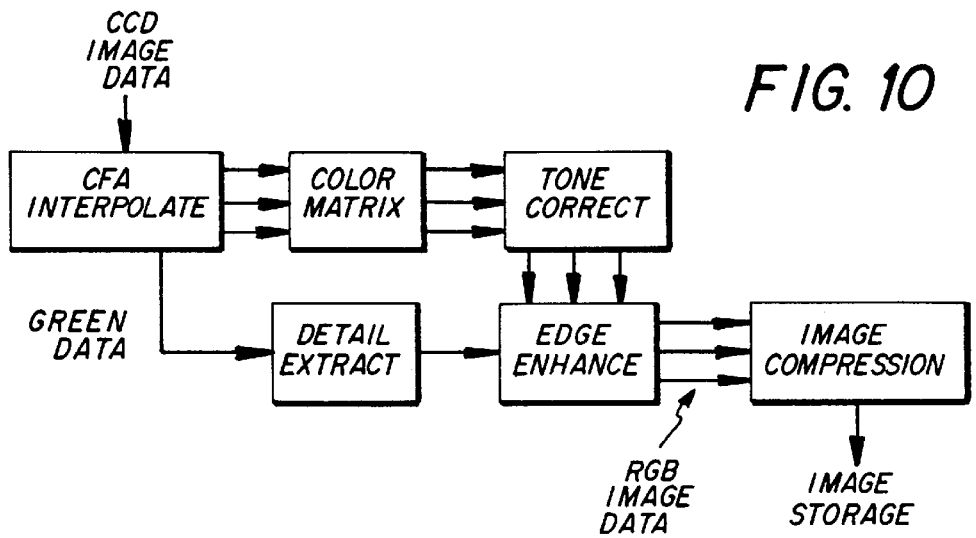
FIG. 10 shows one example of still mode image processing.

Once the still image is captured, the digital processor 36 implements the stored firmware procedures to process and store the still image. FIG. 10 shows a diagram of one possible still image processing method. The CFA interpolation diagram may include the green interpolation method described in U.S. patent application Ser. No. 085,520, filed Jun. 30, 1993, in the name of the same assignee as the present application, and the chrominance interpolation method described in U.S. Pat. No. 4,642,678, both of which are incorporated herein by reference. The color matrix, tone correction, and edge enhancement steps may be similar to those described in U.S. Pat. No. 5,189,511, also incorporated herein by reference. The image compression method may be the JPEG standard compression technique.

The foregoing description envisions taking a single still picture following the motion preview mode. The camera can also optionally capture "bursts" of high quality still images into the DRAM memory during the "still" mode, which are then processed as shown in FIG. 10. Owing to the flash recharge time and other limitations of the "burst" mode, the "burst" mode could utilize different exposure parameters (exposure time, aperture, analog gain, flash, and digital processing) than either the motion or the single still mode.

The invention has been described with reference to a preferred embodiment. However, it will be appreciated that variations and modifications can be effected by a person of ordinary skill in the art without departing from the scope of the invention. For instance, FIG. 3B shows a progressive scan sensor with two readout registers 86 and 88 (which corresponds to the Performance Specification document for the Kodak KAI-031CM image sensor; the preferred embodiment of FIG. 3A simply uses but one register). The purpose is to eliminate the FIFO line delay 80 in the LCD pixel remapper 62. The pairs of lines read out by the registers include both a green/red line and a blue/green line. Therefore, by adding an analog multiplexer between the outputs of the two channels and the analog gain and CDS block 32, which is switched at ½ the sensor horizontal clock rate, it is possible to obtain a GRBG sequence of sensor data values at the output of the A/D stage 34. The LCD pixel remapper 62 can then be designed to map from the CCD sensor color pixel pattern to the required RGBRGB LCD pixel pattern, without using a line delay. Since two CCD lines are read out in parallel, for each LCD line, fewer lines are eliminated via the fast dump gate than for the single-register sensor shown in FIG. 3A.

In particular, if the dual register CCD in FIG. 3B had 512×768 square pixels with a 3:2 aspect ratio, and the LCD had approximately 240 display lines and a 4:3 aspect ratio, the CCD readout would involve fast dumping one pair of lines for every four pairs of lines read out from the CCD sensor. The pixel readout procedure for the horizontal registers can then be varied depending on the mode of operation: both registers are used for the motion imaging mode and one register is used for the still imaging mode. Furthermore, although the Bayer pattern was described, other mosaic-type filter patterns could be used to advantage, for example, complementary patterns involving cyan, magenta, yellow and green filters. The processing for the LCD pixel remapper 62 and the LCD color adjust circuit 63 would be accordingly modified to account for the different color arrangement.

PARTS LIST

1 upper plate
2 lower plate
3 common transparent electrode
4 array of color filters
5 black mask
6 array of transparent pixel electrodes
7 thin film transistors
8 source lines
9 gate line
10 color LCD display
12 control section
14 zoom buttons
15 preview button
16 capture button
18 flash
20 progressive scan interline
22 zoom lens
24 mechanical aperture
26 memory card
27 timing and control section
28 sensor timing circuit
30 sensor drivers
32 analog gain and CDS
34 A/D converter
36 digital image processor
38 DRAM memory
40 card interface
42 EPROM memory
44 zoom motor
46 focus motor
48 variable aperture
50 lens motor drivers
52 control interface
53 flash control circuit
54 photosystems interface
55 user status and control section
56 high speed interface
58 preview mode processing circuit
60 image statistics processor
62 pixel remapper
63 color adjustment circuit
64 multiplexer
66 pixel
68 vertical readout register
70 horizontal register 72 fast dump structure
74 sensor substrate
76 green pixel summer
78 red/blue summer
80 fifo
82 two pixel delay registers
84 array
86 first readout register
88 second readout register
90 image area
92 LCD display screen
94 status area
96 reconfigurable buttons
100 oscillator
102 divider
104 multiplexer

What is claimed is:

1. An electronic still camera for initiating capture of a still image while previewing motion images on a display, comprising:
   (a) an image sensor having a two-dimensional array of photosites covered by a mosaic pattern of color filters including at least three different colors for capturing images of a scene, each captured image having a first number of color pixel values provided in a first color pattern;
   (b) motion processing means for generating from the captured images, a second number of color pixel values provided in a second color pattern having at least three different colors and representative of a series of motion images to be previewed, the second number of color pixel values being less than the first number of color pixel values, and the second color pattern being different from the first color pattern;
   (c) a color display for presenting at least some of the motion images of the series of motion images corresponding to the captured images of the scene, the color display having an arrangement of color display pixels including at least three different colors in a pattern different from the first color pattern;
   (d) a capture button for initiating capture of a still image while previewing the motion images presented on the color display;
   (e) still processing means for generating a third number of color pixel values including at least three different colors representative of a processed captured still image; and
   (f) a digital memory for storing the processed captured still image.

2. The electronic still camera of claim 1 further including a multiplexer having first and second inputs and an output, wherein the first input is coupled to the first processing means, the second input is coupled to the second processing means, and the output is coupled to the display so that a captured still image can be viewed on the display.

3. The electronic still camera of claim 1 wherein the first processing means and the second processing means are integrated into a single integrated circuit.

4. The electronic still camera of claim 1 wherein the motion processing means and the still processing means produce the second number of pixels and the third number of pixels, respectively, prior to transferring the image pixels to the display and the digital memory, respectively.

5. The electronic still camera of claim 1 wherein the second number of pixel values representative of the series of motion images are transferred to the display in a digital format.

6. The electronic still camera of claim 1 wherein the second number of pixel values representative of the series of motion images are mapped into a form suitable for display.

7. The electronic still camera of claim 6 wherein after the second number of pixel values representative of the series of motion images are mapped into a form suitable for display, the signals representing the captured images are converted back into an analog form.

8. The electronic still camera of claim 1 further including a firmware memory, a processor, and an application specific integrated circuit, and wherein the first processing means is provided in the application specific integrated circuit, and the second processing means is provided using the processor which implements software procedures stored in the firmware memory.

9. The electronic still camera of claim 1 wherein the image sensor includes a color filter array to produce color image data, the second processing means processes the color image data and performs JPEG image compression on the captured still image, and the JPEG compressed still image is stored in the digital memory.

10. The electronic still camera of claim 9 wherein the digital memory is a removable memory card.

11. The electronic still camera of claim 1 wherein the first color pattern includes substantially one-half green color filters.

12. The electronic still camera of claim 11 wherein the color display pixels are arranged in a pattern having substantially one-third green color filters.

13. The electronic still camera of claim 1 wherein the first color pattern is a Bayer checkerboard pattern.

14. The electronic still camera of claim 1 wherein the distance between adjacent image sensor photosites in the horizontal direction are substantially equal to the distance between the adjacent image sensor photosites in the vertical direction, and wherein the distance between the adjacent color display pixels in the horizontal direction is different than the distance between the adjacent color display pixels in the vertical direction.

15. An electronic still camera for initiating capture of a still image while previewing motion images on a display, comprising:
   (a) an image sensor having a two-dimensional array of photosites covered by a mosaic pattern of color filters including at least three different colors for capturing images of a scene, each captured image having a first number of color pixel values provided in a first color pattern;
   (b) a motion processor for generating from the captured images, a second number of color pixel values provided in a second color pattern having at least three different colors and representative of a series of motion images to be previewed, the second number of color pixel values being less than the first number of color pixel values, and the second color pattern being different from the first color pattern;
   (c) a color display for presenting at least some of the motion images of the series of motion images corresponding to the captured images of the scene, the color display having an arrangement of color display pixels including at least three different colors in a pattern different from the first color pattern;
   (d) a capture button for initiating capture of a still image while previewing the motion images presented on the color display;
   (e) a still processor for generating a third number of color pixel values including at least three different colors representative of a captured still image; and (f) a digital memory for storing the processed captured still image.

16. The electronic still camera of claim 15 further including a multiplexer having first and second inputs and an output, wherein the first input is coupled to the first processor, the second input is coupled to the second processor, and the output is coupled to the display so that a captured still image can be viewed on the display.

17. The electronic still camera of claim 15 wherein the first processor and the second processor are integrated into a single integrated circuit.

18. The electronic still camera of claim 15 wherein the motion processor and the still processor produce the second number of pixels and the third number of pixels, respectively, prior to transferring the image pixels to the display and the digital memory, respectively.

19. The electronic still camera of claim 15 wherein the second number of pixel values representative of the series of motion images are transferred to the display in a digital format.

20. The electronic still camera of claim 15 wherein the second number of pixel values representative of the series of motion images are mapped into a form suitable for display.

21. The electronic still camera of claim 20 wherein after the second number of pixel values representative of the series of motion images are mapped into a form suitable for display, the signals representing the captured images are converted back into an analog form.

22. The electronic still camera of claim 15 further including a firmware memory, and an application specific integrated circuit, and wherein the first processor is provided in the application specific integrated circuit, and the second processor implements software procedures stored in the firmware memory.

23. The electronic still camera of claim 15 wherein the image sensor includes a color filter array to produce color image data, the second processor processes the color image data and performs JPEG image compression on the captured still image, and the JPEG compressed still image is stored in the digital memory.

24. The electronic still camera of claim 23 wherein the digital memory is a removable memory card.

25. The electronic still camera of claim 15 wherein the first color pattern includes substantially one-half green color filters.

26. The electronic still camera of claim 25 wherein the color display pixels are arranged in a pattern having substantially one-third green color filters.

27. The electronic still camera of claim 15 wherein the first color pattern is a Bayer checkerboard pattern.

28. The electronic still camera of claim 15 wherein the distance between adjacent image sensor photosites in the horizontal direction are substantially equal to the distance between the adjacent image sensor photosites in the vertical direction, and wherein the distance between the adjacent color display pixels in the horizontal direction is different than the distance between the adjacent color display pixels in the vertical direction.

* * * * *

US006292218C1

(12) EX PARTE REEXAMINATION CERTIFICATE (8510th)

United States Patent
Parulski et al.

(10) Number: US 6,292,218 C1
(45) Certificate Issued: Sep. 6, 2011

(54) ELECTRONIC CAMERA FOR INITIATING CAPTURE OF STILL IMAGES WHILE PREVIEWING MOTION IMAGES

(75) Inventors: Kenneth A. Parulski, Rochester, NY (US); Timothy J. Tredwell, Fairport, NY (US)

(73) Assignee: Eastman Kodak Company, Rochester, NY (US)

Reexamination Request:
No. 90/010,631, Jul. 31, 2009
No. 90/010,899, Mar. 9, 2010

Reexamination Certificate for:
Patent No.: 6,292,218
Issued: Sep. 18, 2001
Appl. No.: 08/895,094
Filed: Jul. 16, 1997

Related U.S. Application Data

(62) Division of application No. 08/367,399, filed on Dec. 30, 1994, now Pat. No. 5,828,406.

(51) Int. Cl.
*H04N 9/04* (2006.01)
*H04N 3/15* (2006.01)
*H04N 5/335* (2006.01)
*H04N 1/21* (2006.01)

(52) U.S. Cl. .............................. 348/220.1; 348/333.11; 348/E3.02; 348/E3.022; 348/E5.047; 348/E5.091; 348/E9.01

(58) Field of Classification Search .................. None
See application file for complete search history.

(56) References Cited

U.S. PATENT DOCUMENTS

| | | |
|---|---|---|
| 3,971,065 A | 7/1976 | Bayer |
| 4,456,931 A | 6/1984 | Toyoda et al. |
| 4,541,010 A | 9/1985 | Alston |
| 4,691,253 A | 9/1987 | Silve |
| 4,740,828 A | 4/1988 | Kinoshita |
| 4,746,980 A | 5/1988 | Petersen |
| 4,746,988 A | 5/1988 | Nutting et al. |
| 4,754,333 A | 6/1988 | Nara |
| 4,764,805 A | 8/1988 | Rabbani et al. |
| 4,774,562 A | 9/1988 | Chen et al. |
| 4,802,020 A | 1/1989 | Miyake et al. |
| 4,819,059 A | 4/1989 | Pape |
| 4,837,628 A | 6/1989 | Sasaki |
| 4,876,590 A | 10/1989 | Parulski |
| 4,881,127 A | 11/1989 | Isoguchi et al. |

(Continued)

FOREIGN PATENT DOCUMENTS

| | | |
|---|---|---|
| EP | 0 129 122 | 12/1984 |
| EP | 0 202 009 | 11/1986 |
| EP | 0 212 784 | 3/1987 |

(Continued)

OTHER PUBLICATIONS

L. J. D'Luna et al., A Digital Video Signal Processor for Color Image Sensors, ISSCC 89, Feb. 16, 1989.

(Continued)

*Primary Examiner*—Linh M. Nguyen

(57) ABSTRACT

An electronic camera uses a relatively more complex digital image processing technique in a still image mode to produce high quality still images, and a relatively more simple image processing technique in a motion preview mode to produce preview images of acceptable quality prior to initiation of the still image mode. The more complex digital technique is done in software in a general purpose processor section 35, while the more simple digital technique is implemented in a fixed digital circuit in an application specific integrated circuit 27, which also implements timing and control functions. The motion preview mode uses a shorter image readout period than the still mode and further involves mapping image sensor pixels into a fewer number of color display pixels on a color LCD display 10. The mapping further converts color pixel signals from a mosaic array into a different color pattern on the color LCD display 10.

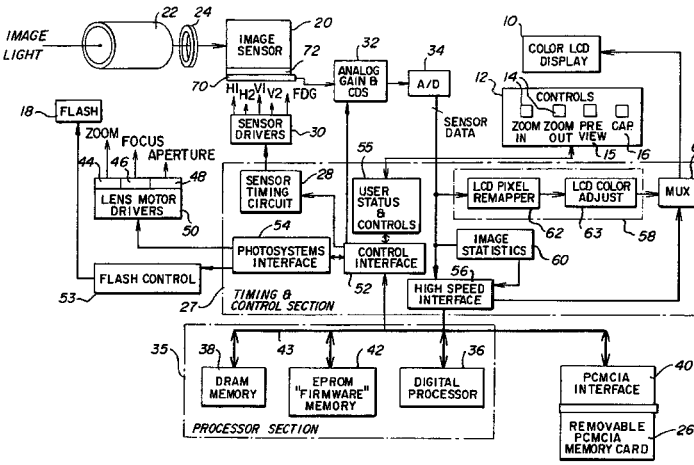

U.S. PATENT DOCUMENTS

| | | | |
|---|---|---|---|
| 4,928,137 | A | 5/1990 | Kinoshita |
| 5,018,017 | A | 5/1991 | Sasaki et al. |
| 5,067,019 | A | 11/1991 | Juday et al. |
| 5,138,454 | A | 8/1992 | Parulski |
| 5,138,459 | A | 8/1992 | Roberts et al. |
| 5,161,025 | A | 11/1992 | Nakao |
| 5,164,831 | A | 11/1992 | Kuchta et al. |
| 5,164,834 | A | 11/1992 | Fukuda et al. |
| 5,177,614 | A | 1/1993 | Kawaoka et al. |
| 5,251,036 | A | 10/1993 | Kawaoka et al. |
| 5,264,939 | A | 11/1993 | Chang |
| RE34,654 | E | 7/1994 | Yamawaki |
| 5,335,016 | A | 8/1994 | Nakagawa |
| 5,341,153 | A | 8/1994 | Benzschawel et al. |
| 5,379,069 | A | 1/1995 | Tani |
| 5,396,290 | A | 3/1995 | Kannegundla et al. |
| 5,444,482 | A | 8/1995 | Misawa et al. |
| 5,479,206 | A | 12/1995 | Ueno et al. |
| 5,497,193 | A | 3/1996 | Mitsuhashi et al. |
| 5,581,301 | A | 12/1996 | Ninomiya |
| 5,612,732 | A | 3/1997 | Yuyama et al. |
| 5,717,496 | A | 2/1998 | Satoh et al. |
| 6,084,633 | A | 7/2000 | Gouhara et al. |
| 6,487,366 | B1 | 11/2002 | Morimoto et al. |

FOREIGN PATENT DOCUMENTS

| | | |
|---|---|---|
| EP | 0 323 194 | 7/1989 |
| EP | 0 405 491 | 1/1991 |
| EP | 0 458 369 | 4/1991 |
| EP | 0 533 107 | 9/1991 |
| EP | 0 456 369 | 11/1991 |
| GB | 2 089 169 | 6/1982 |
| JP | 82-78281 | 5/1982 |
| JP | 57-078281 | 5/1982 |
| JP | 60-136481 | 7/1985 |
| JP | 61-253982 | 11/1986 |
| JP | 61-264880 | 11/1986 |
| JP | 62-108678 | 5/1987 |
| JP | 6-3064485 | 3/1988 |
| JP | 63-128879 | 6/1988 |
| JP | 63-286078 | 11/1988 |
| JP | 64-013877 | 1/1989 |
| JP | 01-221985 | 9/1989 |
| JP | 01-221989 | 9/1989 |
| JP | H1-243686 | 9/1989 |
| JP | 02-007680 | 1/1990 |
| JP | 2-105786 | 4/1990 |
| JP | H2-214271 | 8/1990 |
| JP | 03-1681 | 1/1991 |
| JP | 03-500119 | 1/1991 |
| JP | 03-143084 | 6/1991 |
| JP | 03-234182 | 10/1991 |
| JP | 3-252282 | 11/1991 |
| JP | 3-284079 | 12/1991 |
| JP | 04-35181 | 2/1992 |
| JP | H04-35181 | 2/1992 |
| JP | 04-142892 | 5/1992 |
| JP | 04-170176 | 6/1992 |
| JP | 04-213970 | 8/1992 |
| JP | 4-239279 | 8/1992 |
| JP | 4-319893 | 11/1992 |
| JP | 4-324778 | 11/1992 |
| JP | 4-348685 | 12/1992 |
| JP | 5-122574 | 5/1993 |
| JP | H5-122574 | 5/1993 |
| JP | 05-167908 | 7/1993 |
| JP | 06-110107 | 4/1994 |
| JP | 07-264489 | 10/1995 |
| JP | 07-312714 | 11/1995 |
| WO | 89/12939 | 12/1989 |
| WO | 91/14334 | 9/1991 |

OTHER PUBLICATIONS

T. J. Tredwell, Sensors and Signal Processing for Digital Electronic Photography, Optoelectronics—Devices & Technologies, Dec. 1991, pp. 287–300, vol. 6 No. 2.

I. Shenberg et al., An Image Compression Chip Set for Digital Still Cameras and Peripherals, Electronic Imaging International, Sep. 30, 1991.

G. K. Wallace, Overview of the JPEG (ISO/CCITT) Still Image Compression Standard, SPIE, 1990, pp. 220–233, vol. 1244.

S. Tsuruta et al., Color Pixel Arrangement Evaluation for LC–TV, 1985 International Display Research Conference.

Exhibit 23 of the Hunt Expert Report—ECAM Image Card File Format Preliminary Specifications EM ECAM Program, Prepared by Noel Reyner, Jul. 26, 1990; Capture and Transmission Dept Image Acquisition Products Division; pp. 1–8.

Exhibit 24 of the Hunt Expert Report—ECAM C30/CL550 Interface, Prepared by David Zimmer, Eastman Kodak Company, Rochester, N.Y., Ver. A; Jul. 23, 1990.

Exhibit 28 of the Hunt Expert Report—Hawkeye II SCSI Interface Specification—Draft; J. McGarvey.

Exhibit 29 of the Hunt Expert Report—Hawkeye II SCSI Interface Specification; Oct. 26, 1990; J. McGarvey.

Exhibit 66 of the Hunt Expert Report—I. Shenberg, et al., An Image Compression Chip Set for Digital Still Cameras and Peripherals, Electronic Imaging International, Sep. 30, 1991; pp. 439–447.

Exhibit 95 of the Hunt Expert—Venus Digital Electronic Camera Preliminary Specification [Smith Dep. Ex 5]; Dec. 2, 1993.

Exhibit 96 of the Hunt Expert Report—User's Manual: Kodak Professional Digital Camera System [McGarvey Dep. Ex. 11]; 1991/1992.

Exhibit 108 of the Hunt Expert Report—Apple QuickTake 100 User's Manual [Napoli Dep. Ex. 3].

Exhibit 109 of the Hunt Expert Report—Chameleon Technical Plan v. 0.2; May 12, 1992 [Parulski Dep. Ex. 16].

Imaide, T., et al.; A Multimedia Color Camera Providing Multi–Format Digital Images (IEEE Transactions on Consumer Electronics—Aug. 1993; vol. 39; No. 3); Jun. 11, 1993; pp. 467–473.

Japanese News Release Article (Casio); 3 Pgs.

Japanese Article—Electronic Engineering; 1993, vol. 35, No. 1; pp. 1–5.

Apple QuickTake 100—User's Guide for Macintosh; 1994; pp. 1–71.

Printout—Ohmori, S.; EKJRD Program: Computer Camera (KJP–315); MO: Dec. 1992; 1 Pg.

Ochi, S., et al.; Development of the "DS–1P" Memory Card Camera; Fuji Film and Research & Development (No. 35); 1990; pp. 52–57.

Izawa, F., et al.; Digital Still Video Camera Using Semiconductor Memory Card; 1990 IEEE; pp. 1–9.

Japanese Printout—Ricoh (1993); pp. 7–11.

Tredwell, T.J.; Sensors and Signal Processing for Digital Electronic Photography; pp. 287–300; Optoelectronics—Devices and Technologies—Special Issue on Image Sensing Devices; vol. 6, No. 2; Dec. 1991.

D'Luna L., et al.; A Digital Video & Image Processor; 1989 IEEE International Solid State Circuits Conference; pp. 158–159 & Con't on p. 323.

M. Sasaki, et al.; Signal Processing Technologies for a Digital Still Camera; Toshiba; 1991; vol. 46, No. 2; pp. 125–128 (w/Certified English Translation).

Wallace, G. K.; Overview of the JPEG (ISO/CCITT) Still Image Compression Standard—SPIE vol. 1244 Image Processing Algorithms and Techniques (1990); p. 220–233.

Watanabe, M., et al., A Bit Rate Controlled DCT Compression Algorithm for Digital Still Camera—SPIE vol. 1244 Image Processing Algorithms and Techniques (1990); pp. 234–239.

Article—ITEJ Technical Report, vol. 13, No. 22, Mar. 31, 1989 (w/Certified English Translation).

Shinbun, D., Digital Still Camera—The First for Commercial Use in a Joint Development, Toshiba and Fuji Film Move Toward December Sales (7th Edition); Oct. 17, 1989 (w/Certified English Translation).

Nippon, K. K., Digital Still Camera on Sale—Toshiba and Fuji Film will Move to a Commercial Use [product] in December, Oct. 17, 1989; (w/Certified English Translation).

Printout—Digital Still Camera System Joint Announcement Q & A; pp. 1–3 (w/Certified English Translation).

Shibun, N. K.; IC Camera in Test Production—Toshiba and Fuji Photo Film in Collaboration; Mar. 24, 1989 (w/Certified English Translation).

Printout—Corporate–External Announcement Permission Request Form (w/Certified English Translation; Feb. 6, 1990.

Printout—Fuji Film—Fujix Memory Card Camera; 2 Pgs.

Printout—Fujix—Digital Still Camera System—Memory Card Camera DS–X (w/Certified English Translation).

Patent Specification for Application No. 204,626; Jan. 18, 1923.

Patent Specification for Application No. 289,944; Feb. 8, 1927.

Fujimori, H., et al.; Digital Card Camera—ITEJ Technincal Report vol. 14, No. 5, pp. 7–11; Jan. 18, 1990 (w/Certified English Translation).

Printout—IC Card Camera System—Toshiba & Fuji Photo Film (Mar. 30, 1989 Dempa Daily Newspaper Technical Report).

Ohnishi, K., et al.; Electronic Still–Picture Camera Using Magnetic Bubble Memory—1982 IEEE; pp. 321–324.

Parulski, K.; Color Filters and Processing Alternatives for One–Chip Cameras—IEEE Transactions on Electron Devices, vol. ED–32, No. 8, Aug. 1985; pp. 1381–1389.

D'Luna, L., et al.; A Systems Approach to Custom VLSI for a Digital Color Imaging System—IEEE Journal of Solid–State Circuits, vol. 26, No. 5, May 1991; pp. 727–737.

Nakagawa, M., et al.; DCT–Based Still Image Compression ICS with Bit–Rate Control—1992 IEEE; pp. 711–717.

Kihara, N., et al.; The Electronic Still Camera a New Concept in Photography—1982 IEEE; pp. 325–331.

Wood, R. C.; Japan Watch—Photos Go Electronic—New Standard Pulls Images into Computer Age; Feb. 1988—High Technology Business; p. 15.

Gray, R.; Multispectral Data Compression Using Staggered Detector Arrays, A Dissertation Submitted to the Faculty of the Committe on Optical Sciences (Graduate)—In Partial Fulfillment of the Requirement for the Degree of Doctor of Philosophy in the Graduate College—The University of Arizona; 140 Pgs.

Okada, S., et al.; A Single Chip Motion JPEG Codec LSI—IEEE 1997 Custom Integrated Circuits Conference; pp. 233–236.

Itoh, Y., et al; Nonvolatile Memories; 1989 IEEE International Solid State Circuits Conference; pp. 134–135 & Cont. on p. 314.

Printout—Black and White Photo of Camera.

Suzuki, M., et al.; Standard Subscriber Line Compatible Color Videophone—1988 IEEE; pp. 759–768.

Hoshikowa, E., et al.; Development of High Quality MS Camcorder VL–HL1; pp. 67–70 (Sharp Technical Journal).

Printout—Black and White Photo of Camera (Olympus) VC–1000 Digital Still Camera; 1 Pg.

Printout (Japanese) w/out Eng. Translation; pp. 57–112.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 15 and 23-27 is confirmed.

Claims 1-14, 16-22, and 28 were not reexamined.

* * * * *